Jan. 22, 1957
J. R. HANSEN
2,778,185
SWEEP RAKE TOOTH POINT
Filed March 6, 1956
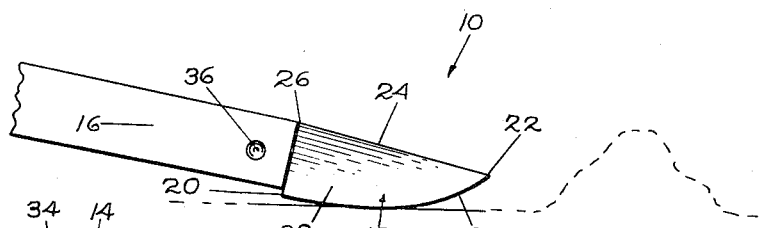
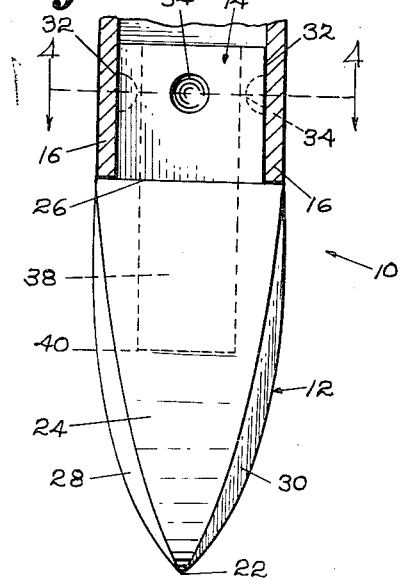
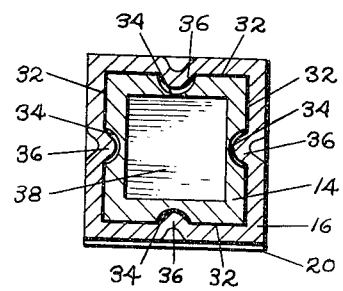
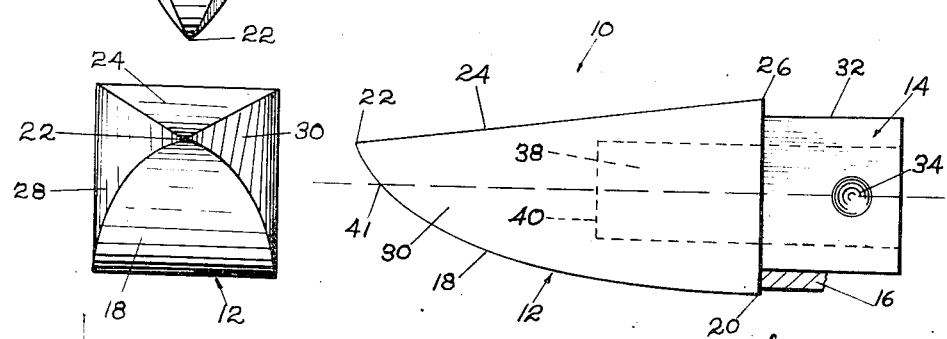
INVENTOR.
J. R. Hansen
BY Arthur H. Sturges
Attorney

United States Patent Office 2,778,185
Patented Jan. 22, 1957

2,778,185

SWEEP RAKE TOOTH POINT

John R. Hansen, Manning, Iowa

Application March 6, 1956, Serial No. 569,833

3 Claims. (Cl. 56—400)

This invention relates to agricultural implements and machinery particularly of the type adapted for soil cultivation, and in particular a point mounted in the end of a sweep rake tooth and designed so that it will not become embedded in the soil in use and whereby upon encountering mounds of soil or other obstructions it will extricate itself so that it will ride upon the surface of the ground, and, at the same time perform the functions of a sweep rake.

The purpose of this invention is to reduce breakage of sweep rake teeth and provide a point for a sweep rake tooth that will extricate itself from the soil whereby more efficient operation of a sweep rake is assured.

In the design of conventional sweep rake teeth points very little consideration has been given to the problem of "digging in" of the sweep rake teeth in use, and as a result the teeth of sweep rakes break rapidly, particularly when obstructions above the ground are encountered. Furthermore, conventional points of sweep rake teeth become embedded in the soil and it is difficult for the tooth to extricate itself before it breaks.

With these thoughts in mind this invention contemplates a sweep rake tooth point that is designed to cut through the soil with a smooth easy action and without digging in, and in which the tooth seeks to extricate itself continuously in use.

The object of this invention is, therefore, to provide an improved design for a sweep rake tooth which makes it possible for the teeth of sweep rakes to cut through mounds of soil and extricate themselves from the soil in use.

Another object of the invention is to improve the design of points of sweep rake teeth by increasing the bearing surface of the bottom of the point and reducing the width of the upper surface whereby a wedge action of a tooth cutting through mounds of soil is obtained.

Another important object of the invention is to provide an improved point for a sweep rake tooth in which the point is mounted in the sweep rake tooth without screws, bolts, or other similar fastening elements.

It is yet another object of the invention to provide an improved sweep rake tooth point that is adapted to be installed in a sweep rake tooth by the average mechanic.

A further object of the invention is to provide an improved sweep rake tooth point that will provide more efficient operation of the sweep rake.

A still further object is to provide a sweep rake tooth that will not become embedded in the soil in use and that will remain above and ride on the surface of the soil.

And a still further object of the invention is to provide an improved sweep rake tooth point that will cut through mounds of soil and ride upon the surface of the ground in which the point is of a simple and economical construction.

With these and other objects and advantages in view the invention embodies a sweep rake tooth point having a shank with flat sides and having a cavity extended inwardly from the extended end, and in which an arcuate lower surface of the point is of greater width than a flat upper surface thereof and in which the bottom and upper surface are connected with tapering and inclined side surfaces.

Other features and advantages of the invention will appear from the following description taken in connection with the drawings, wherein:

Figure 1 is a side elevational view of the improved sweep rake tooth point showing the point mounted in the end of a sweep rake tooth, and showing a portion of the ground with a mound of soil directly ahead of the point in dotted lines.

Figure 2 is a plan view of the improved sweep rake tooth point showing the point with the shank thereof in the end of a sweep rake tooth, parts of which are broken away and parts shown in section, and the parts being shown on an enlarged scale.

Figure 3 is an end elevational view of the point.

Figure 4 is a cross section through the shank of the point and end of the sweep rake tooth taken on line 4—4 of Figure 2, showing the method of mounting the point in the tooth.

Figure 5 is a side elevational view of the improved sweep rake tooth point with a portion of a tooth shown in section on the lower side of the shank of the point.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, numeral 12 referring generally to the body of the point, numeral 14 indicating a mounting of the point, and numeral 16 referring to the sweep rake tooth.

The improved point is provided with an arcuate lower surface 18 that extends from a point 20 at the heel to a point 22 at the tip, and, as shown in Figures 2 and 3, the width of the surface 18 is greater than that of the flat upper surface 24 which extends from the tip 22 to the point 26. With the width of the lower surface 18 greater than that of the upper surface 24 the side surfaces 28 and 30 are inclined, sloping inwardly from the edges of the lower surface to the edges of the upper surface.

In the design shown, the shank 14 is square, being provided with four side surfaces 32, and the surfaces 32 are provided with indentations 34 into which nodes 36, struck from the walls of the sweep rake tooth with a punch extend. It will be understood that both the shank and tooth may be provided with any suitable number of sides, and both may be of any other suitable shape.

The body 12 of the point is provided with a cavity 38 which extends from the extended end of the shank inwardly to the point 40 in the point, thereby reducing the weight and providing lighter construction.

It will also be noted, particularly in Figures 1 and 5 that the heel 20 extends downwardly slightly below the surface of the sweep rake tooth to provide extra material

Operation

With the point formed as illustrated and described the broad arcuate lower surface provides a bearing riding over the soil and the sloping side surfaces form a vertically disposed wedge which, in combination with the horizontal wedge formed by the taper of the point provides a spreading action whereby the point extricates itself from hard lumps or mounds of soil. Also with the nose or tip 22 positioned above the axis 41 of the point the point will not dig into the ground when it meets an obstruction, but will tend to plow through or over the obstruction thereby reducing breakage of sweep rake tooth points to a minimum.

From the foregoing specification, it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A sweep rake tooth point comprising a body having a mounting shank on one end and having an arcuate lower surface and a straight upper surface, the extended ends of the upper and lower surfaces meeting at a point slightly below a plane through the high point of the body and parallel to the mounting shank, and said body having tapering and upwardly and inwardly inclined side surfaces, said mounting shank having indentations therein for receiving nodes of a sweep rake tooth for securing the point in the tooth.

2. A sweep rake tooth point comprising a body having an arcuate lower surface extended from a heel at the base to a tip at the forward end, the tip being positioned above the axis of the point and side surfaces of the body tapering from the base to the tip, said body having an upper surface extended from the upper side of the base to the tip, the width of the lower surface of the body being greater than that of the upper surface whereby the side surfaces are inclined from edges of the lower surface to corresponding edges of the upper surface, and said body having a shank with flat sides extended from the base for mounting the point in the end of a sweep rake tooth.

3. In a sweep rake tooth point, the combination which comprises a body having a rectangular-shaped base with a square shank extended from the base and with upper, lower, and side surfaces of the body tapering to a point, the width of the lower surface being greater than that of the upper surface whereby the side surfaces are inclined inwardly from edges of the lower surface to corresponding edges of the upper surface, said lower surface being arcuate and extending from a heel at the base to the point, and said point being positioned above the longitudinal axis of the body, said shank having indentations for receiving material punched from walls of a sweep rake tooth in the surfaces thereof, and said shank and body having a cavity extended inwardly from the extended end of the shank to a point midway of the length of the body for reducing the weight of the point.

References Cited in the file of this patent
UNITED STATES PATENTS

| | | |
|---|---|---|
| 911,017 | Kouns | Jan. 26, 1909 |
| 2,721,439 | Chrunka | Oct. 25, 1955 |